United States Patent [19]
Sommer

[11] Patent Number: 5,980,225
[45] Date of Patent: Nov. 9, 1999

[54] ROTARY PUMP HAVING A DRIVE SHAFT RELEASABLY CONNECTED TO THE ROTOR

[75] Inventor: Manfred Sommer, Untergruppenbach-Vorhof, Germany

[73] Assignee: Sundstrand Fluid Handling Corporation, Arvada, Colo.

[21] Appl. No.: 08/887,049

[22] Filed: Jul. 2, 1997

[30] Foreign Application Priority Data

Jul. 5, 1996 [DE] Germany .......................... 196 27 077

[51] Int. Cl.⁶ .................................................. F04C 2/356
[52] U.S. Cl. .......................... 418/104; 418/216; 418/219; 418/270; 403/338; 403/359.1; 464/182
[58] Field of Search .............................. 418/70, 216, 219, 418/270, 104; 464/179, 182; 403/335, 338, 356, 359.1, 359.6

[56] References Cited

U.S. PATENT DOCUMENTS

| | | | |
|---|---|---|---|
| 1,690,728 | 11/1928 | Jaworowski | 418/216 |
| 2,083,560 | 6/1937 | Grey et al. | 418/219 |
| 2,303,031 | 11/1942 | Dusevoir | 403/338 |
| 2,990,782 | 7/1961 | Phillips | 418/216 |
| 3,760,605 | 9/1973 | Schroder | 464/182 |
| 4,838,831 | 6/1989 | Rumberger | 464/182 |

FOREIGN PATENT DOCUMENTS

| | | |
|---|---|---|
| 0129345 | 12/1984 | European Pat. Off. . |
| 2140797 | 1/1973 | France . |
| 2498695 | 7/1981 | France . |
| 1553176 | 12/1970 | Germany . |
| 3418708 | 11/1984 | Germany . |
| 4131628 | 3/1993 | Germany . |
| 2226869 | 11/1990 | United Kingdom ................... 403/338 |

Primary Examiner—John J. Vrablik
Attorney, Agent, or Firm—Antonelli, Terry, Stout & Kraus

[57] ABSTRACT

The pump (20) has a rotor (80) rotatable by a drive in a pump duct (25). The rotor (80) has a pump element (90) with undulating boundary faces extending radially. The boundary faces are bounded cylindrically and run in a fitted manner in a cylindrical conveying region (27), their highest points running adjacent to the end faces (35) of the pump duct in a sealed manner. In addition, a sealing slide (31) is provided, which is displaceable parallel to the axis of rotation (76) and which seals off the pump duct (25) between the inlet (22) and the outlet (23), so that during rotation the rotor (80) follows the undulating movement of the boundary faces (96) of the pump element (90). In addition, sealing means seal off the media-conveying pump chambers from the housing (21). The rotor (80) is detachably connected to the drive shaft (180) while forming connecting boundary faces, which are arranged on the drive side on the other side of the sealing means with respect to the media-conveying pump chambers.

25 Claims, 11 Drawing Sheets

ROTARY PUMP HAVING A DRIVE SHAFT RELEASABLY CONNECTED TO THE ROTOR

BACKGROUND OF THE INVENTION

1. Field of the Invention

The invention relates to a pump for fluids or fluid-like media, in particular for foodstuffs or articles of consumption as well as medicines or cosmetics, with a housing, an inlet, an outlet, a pump operating chamber with a pump duct, an intake chamber, a conveying area, an outlet chamber, and with a rotor which has a rotor shaft and which can be rotated by a drive and which is releasably connected to a drive shaft while forming connecting boundary faces with the aid of a fastener and which has a pump element cylindrical on its external peripheral face and rotating in the pump duct and with undulating boundary faces extending radially from the rotor shaft, in which case the pump duct is cylindrical at least in the conveying area and is provided at least in the conveying area with a pump-duct end face against which the greatest radial points of the pump element rest in a sealed manner, and a shut-off element displaceable axially with respect to the rotor axis is provided in the pump operating chamber, the shut-off element sealing off the pump duct between the inlet and the outlet and comprising opposed sealing faces which rest in a sealed manner against the undulating boundary faces of the pump element, so that during the rotation of the rotor the shut-off element follows the undulating movement of the boundary faces of the pump element, and with a seal which seals off the media-conveying pump chambers from the housing.

2. Description of the Prior Art

A pump of this type is known from DE 34 18 708 A1. In this case the pump element of the rotor is integrally joined to a hollow cylindrical rotor shaft and a hub respectively. The hub is pressed axially onto a hub pin formed with the drive shaft and is connected in a rotationally fixed manner to the hub pin or the drive shaft by means of feather keys engaging in grooves in the hub and the hub pin. In order to fix the hub axially to the pump element on the hub pin the hub pin is provided at its free end with an attachment thread onto which is screwed a mounting and retaining nut which in the tightened state presses the hub against a stop provided at the rear and thus prevents axial displacement. With this design it is not possible to prevent undesired bacteria and/or fungi from eventually becoming established, which can lead to a corresponding contamination of the pumped medium. This is particularly serious for those pumped media whose handling and transportation have to meet rigorous safety and hygiene conditions, i.e. for example for foodstuffs and articles of consumption as well as for medicines and cosmetics. In addition, if the mounting and retaining nut is not properly tightened it can become unscrewed. As a result, this can lead to breakdowns in the pump operation and even to the destruction of essential pump parts in conjunction with complete failure of the pump.

SUMMARY OF THE INVENTION

It is desirable to provide a pump which permits an operation which meets rigorous hygiene requirement even over a prolonged period while conveying sensitive pumped media, or pumped media containing sensitive constituents, such as fruit or foodstuffs, as well as medicines and cosmetics, in a gentle manner, in which case the pump is formed from pump parts which can be easily dismantled and assembled again in an operationally reliable manner, are easy to produce, and are made relatively simple so as to enable the pump to be cleaned easily and thoroughly.

In one aspect the invention provides a pump in which the connecting boundary faces are arranged on the drive side on the opposite side of the sealing means with respect to the media-conveying pump chambers, in order to achieve safe hygienic conditions over a prolonged period. The connecting boundary faces relative to the drive side are outboard of the seal to maintain safe hygienic conditions at the media conveying chamber over the prolonged period.

This can afford the advantage of long operating periods of the pump without interruption by dismantling and re-assembly, and consequently economical operation.

The connecting boundary faces are preferably formed with axial butting structures. In this way, it is possible to achieve improved engagement and force-application conditions.

If the axial butting structures are constructed with substantially flat face profiles formed at right angles to the rotor axis, the fitting space required can be minimized.

In order to improve the transmission of force between the drive shaft and the rotor shaft, the axial butting structures can be constructed with surface profiles engaging in one another with positive locking. In this case the surface profiles are advantageously serrated.

In a second aspect the invention the invention provides a pump in which the fastenors are formed with one or more clamping and connecting devices arranged outside the pump operating chamber and resistant to centrifugal force and absorbing at least axial forces with positive or non-positive locking.

In this way, with satisfactory hygienic conditions the pump parts which come into contact with the pumped medium can be easily dismantled and assembled, in which case in the assembled state a secure connexion to the drive shaft is achieved, which meets the requirements made upon the operational reliability at elevated pump speeds.

The clamping and connecting devices are advantageously formed with clamping and connecting arms which engage over axial butting structures. In this way, with simple dismantling and assembly of the clamping and connecting devices, advantageous force-application conditions with respect to an operationally reliable connexion between the drive shaft and the rotor shaft can be achieved.

The dismantling and assembly conditions can be further simplified if at least two clamping and connecting devices connectable to one another are provided, and/or the the clamping and connecting devices are formed in the manner of a clamp or a bayonet closure.

It is particularly advantageous if the clamping and connecting means are formed with clamping and connecting arms which have groove-like free spaces for engagement into which axial end engagement structures corresponding to the shape of the free spaces for engagement engage in the assembled state. In this way, a satisfactory positively locking connection between the drive shaft and the rotor shaft is achieved.

If the shaft of the rotor and the drive shaft have radial-displacement-prevention devices which penetrate one another at least in part and prevent radial displacement, a particularly quiet, reliable and low-wear pump operation can be achieved, in particular when conveying pump media with contents having constituents in lumps which have to be alternated at brief time intervals or with a different size distribution of the constituents.

The shaft of the rotor and the drive shaft advantageously have displacement-prevention devices which penetrate one another at least in part and prevent displacement. This permits a satisfactory direct transmission of moment, without the rotational forces having to be absorbed by the fasteners.

It is particularly advantageous if the rotor shaft and the drive shaft have both displacement-prevention devices which penetrate one another at least in part and radial-displacement-prevention devices which penetrate one another at least in part.

Various suitable arrangements are possible as the displacement-prevention devices, for example with retaining studs or springs or pins engaging in recesses or openings with exact fitting or by means of an arrangement of the displacement-prevention devices in the manner of a bayonet closure. The displacement-prevention devices are adapted accordingly to the respective pump size and the fitting and force-transmission conditions.

The radial-displacement-prevention devices are advantageously formed with retaining studs or springs or pins which extend parallel to the drive shaft and which engage in corresponding recesses or openings with exact fitting. In this way, a positively locking connexion which is resistant to centrifugal force is formed between the drive shaft and the rotor shaft.

With respect to minimizing the fitting space it is particularly advantageous if the axial end engagement structures are formed with displacement-prevention devices and/or radial-displacement-prevention devices.

For this purpose, the axial end engagement structures can be formed for example with disc-like thickenings which are formed in each case at the end of the rotor shaft and the drive shaft and which each have surface profiles which are arranged around the axis of the disc and engage in one another with positive locking in the assembled state, in which case the said surface profiles can advantageously be serrated.

BRIEF DESCRIPTION OF THE DRAWINGS

Further advantageous arrangements, features, advantages, details, and aspects of the invention may be seen in the following description with reference to the drawings.

Embodiments and variants of the invention are explained below with reference to the drawings, in which.

DESCRIPTION OF THE PREFERRED EMBODIMENTS

Figure 1:
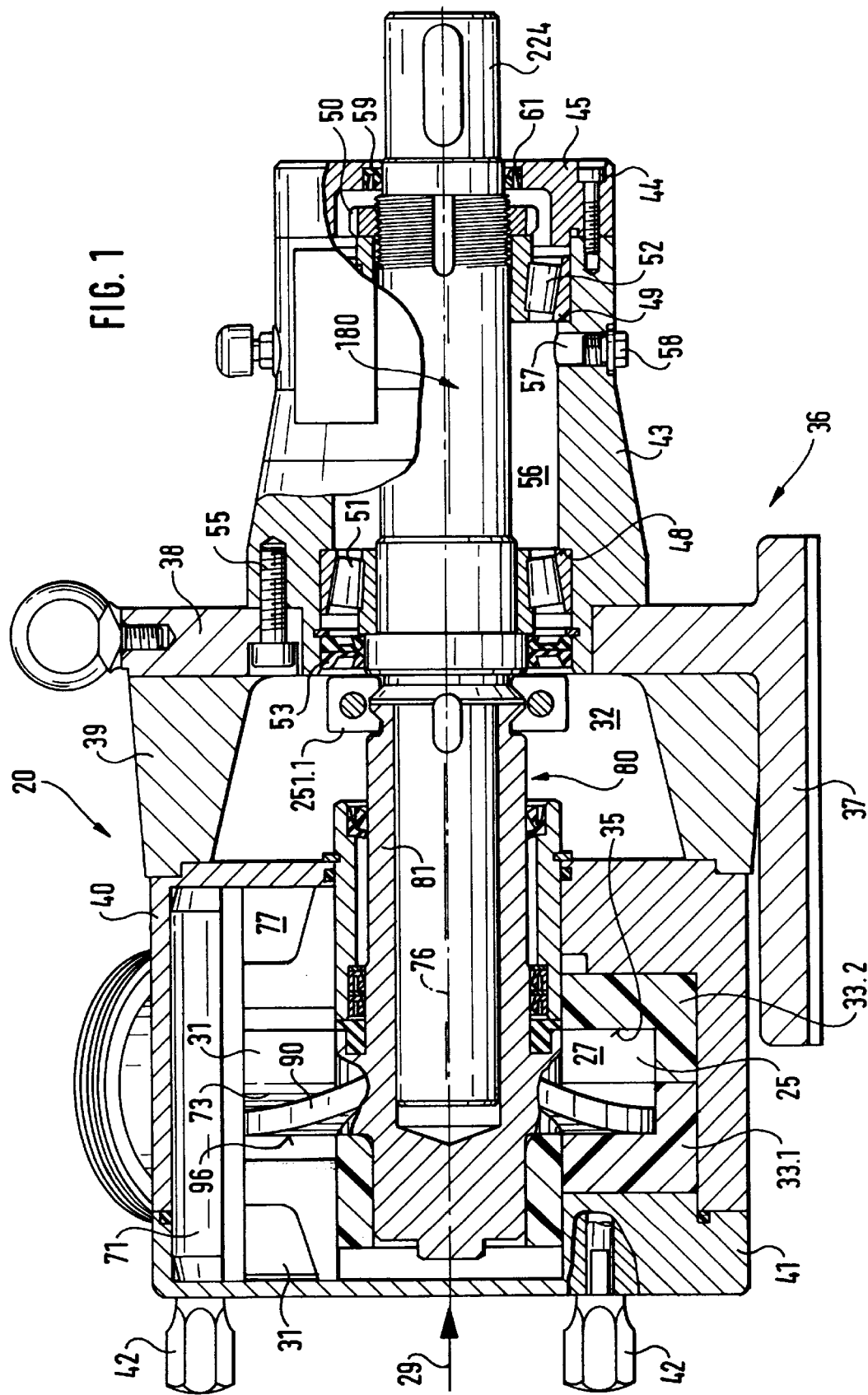
FIG. 1 is a vertical longitudinal section through a pump according to the invention.
Figure 2:
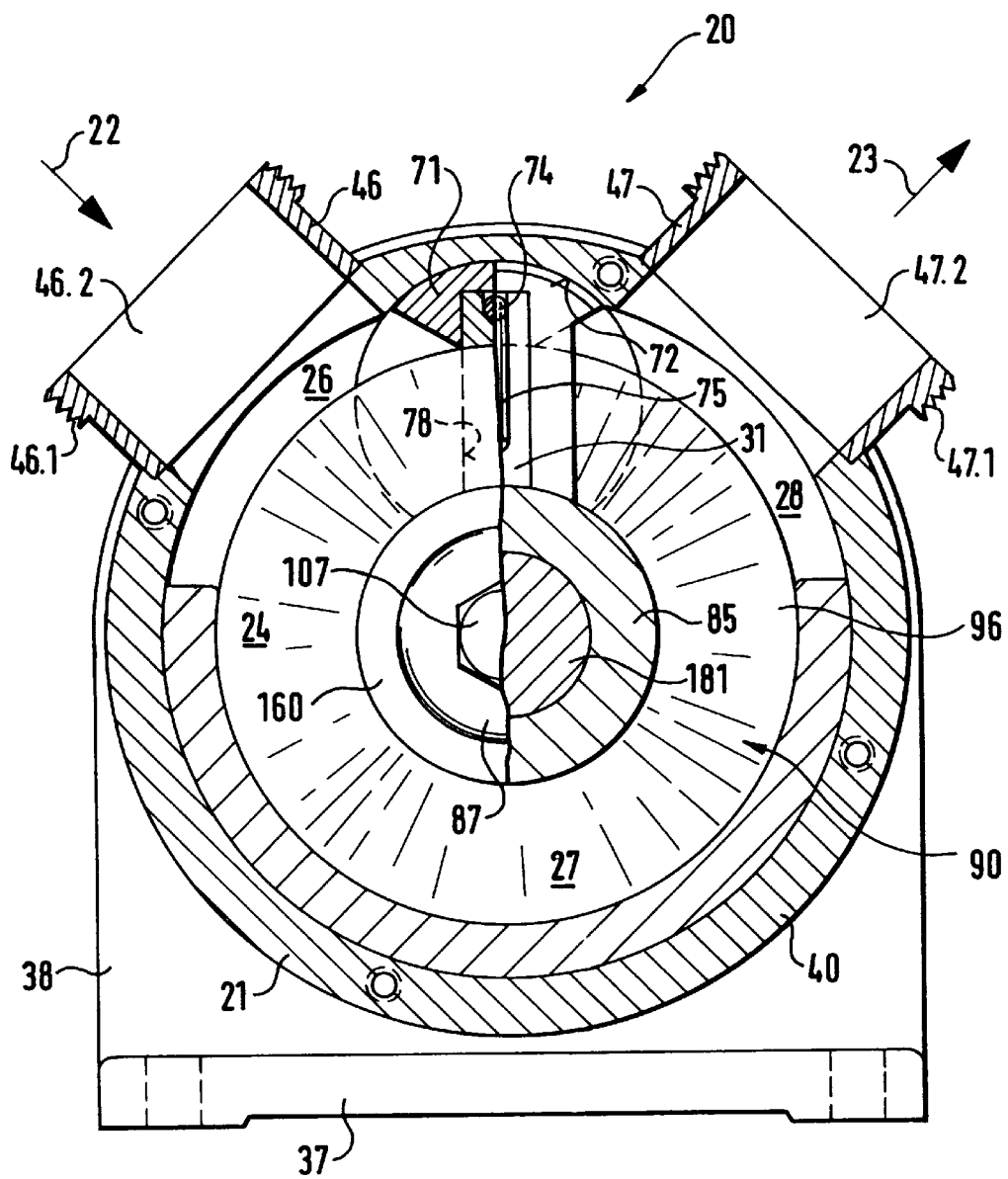
FIG. 2 is a vertical cross-section through the pump according to FIG. 1 with partial cut-away views for illustrating in detail individual parts of the pump as seen in the direction of the arrow 29.
Figure 3:
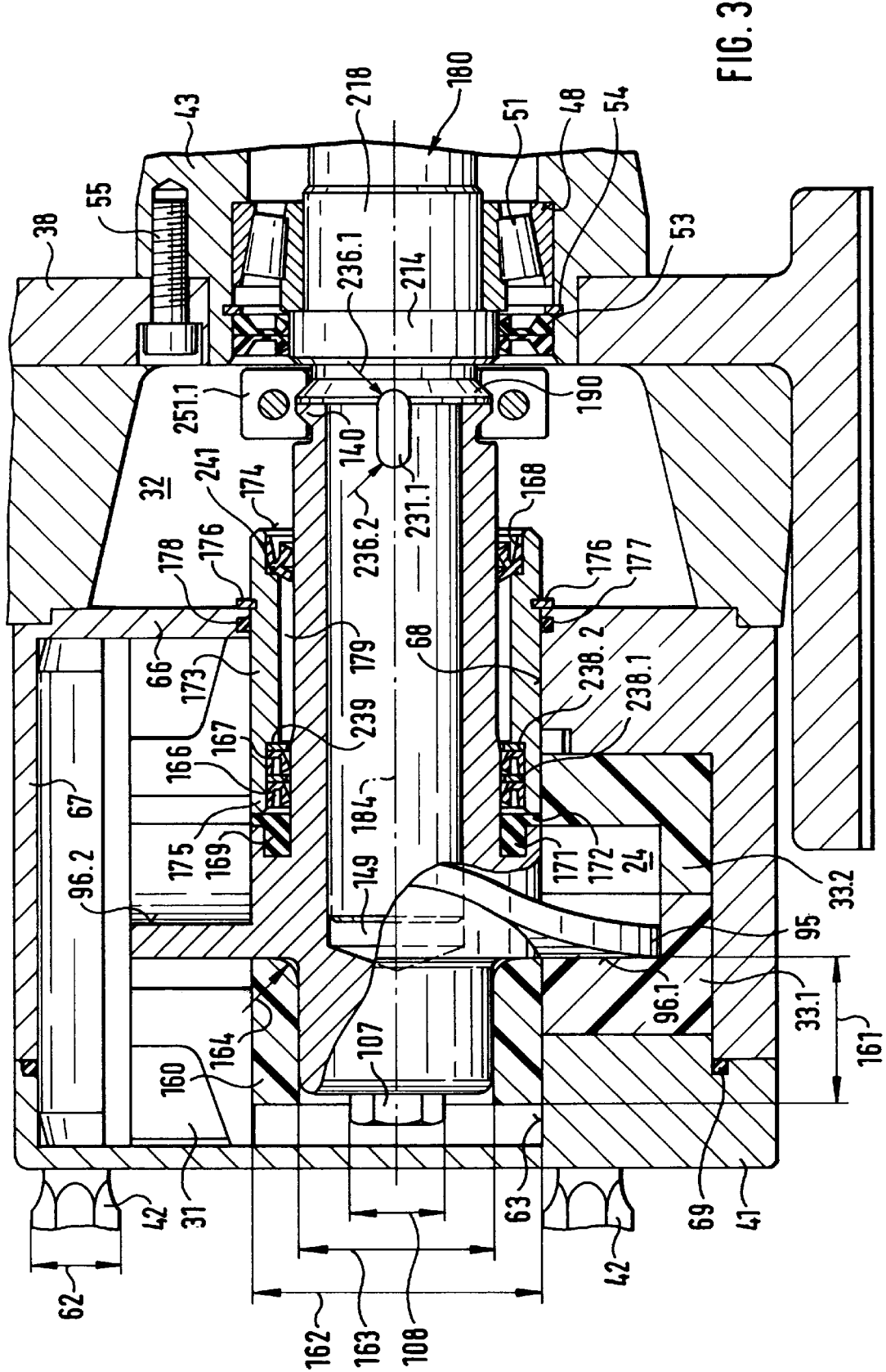
FIG. 3 is an enlarged cut-away view of the vertical longitudinal section of the pump according to FIG. 1.
Figure 4:
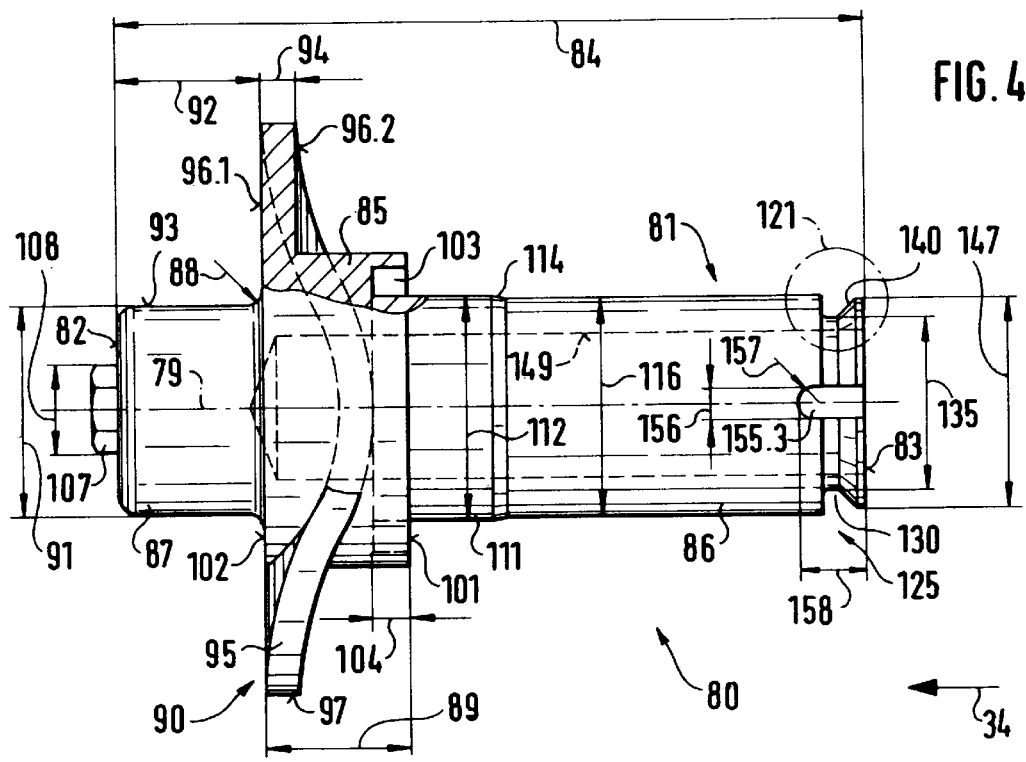
FIG. 4 is a longitudinal elevation with a partial section of the rotor.
Figure 5:
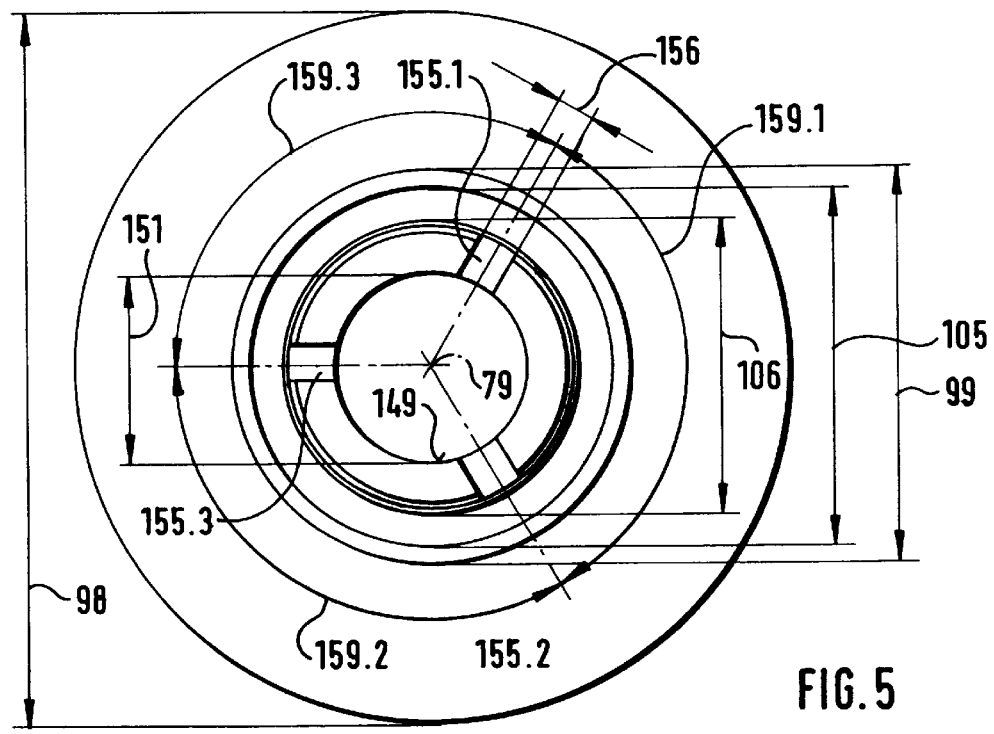
FIG. 5 is a front elevation of the rotor according to FIG. 4 as seen in the direction of the arrow 34.
Figure 6:
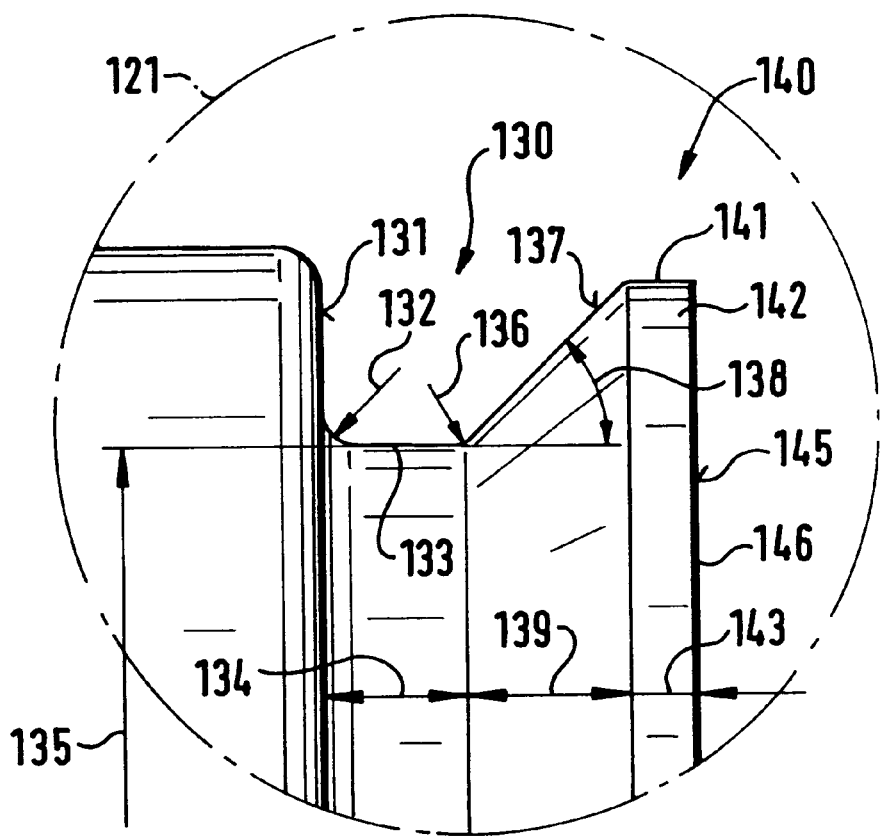
FIG. 6 is a highly enlarged view of the detail designated with the reference numeral 121 in FIG. 4.
Figure 7:
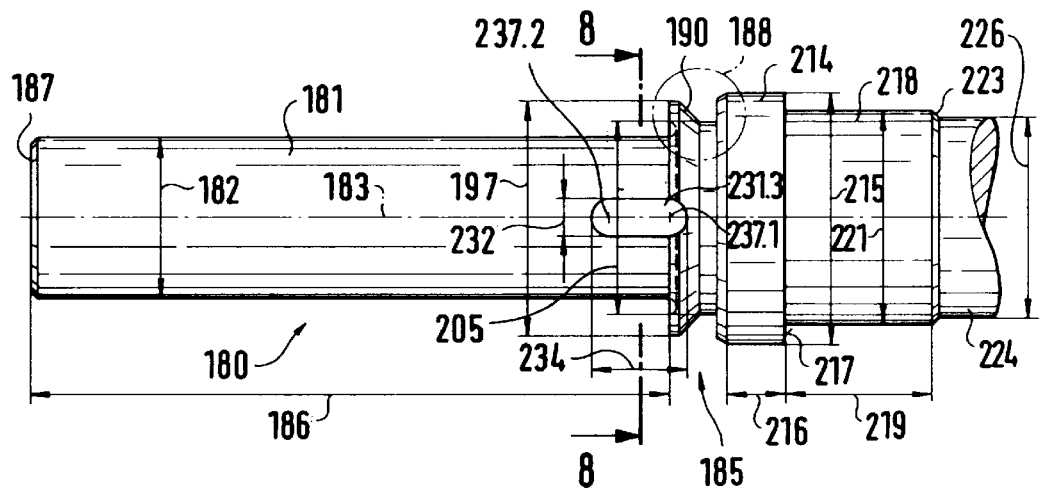
FIG. 7 is a partial longitudinal elevation of the drive shaft.
Figure 8:
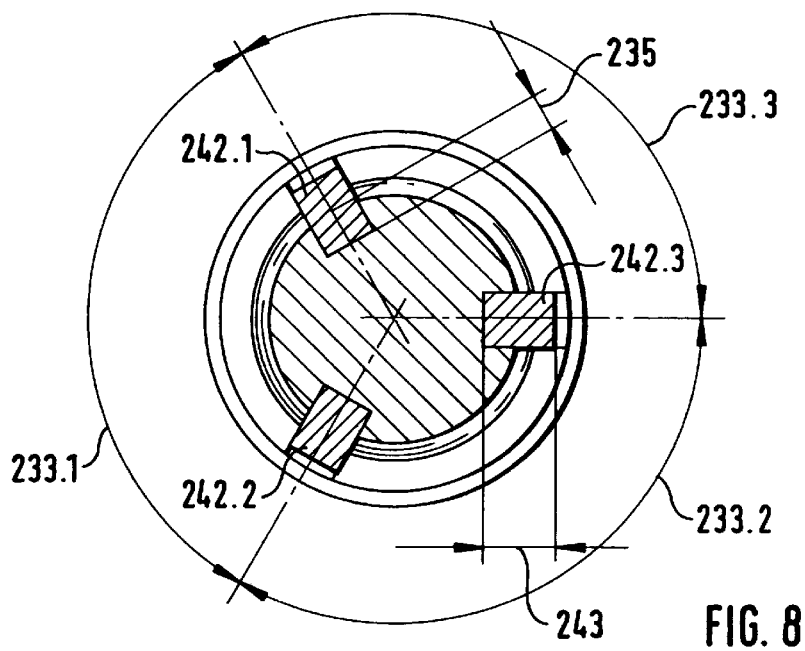
FIG. 8 is a cross-section through the drive shaft along the line 8—8 in FIG. 7.
Figure 9:
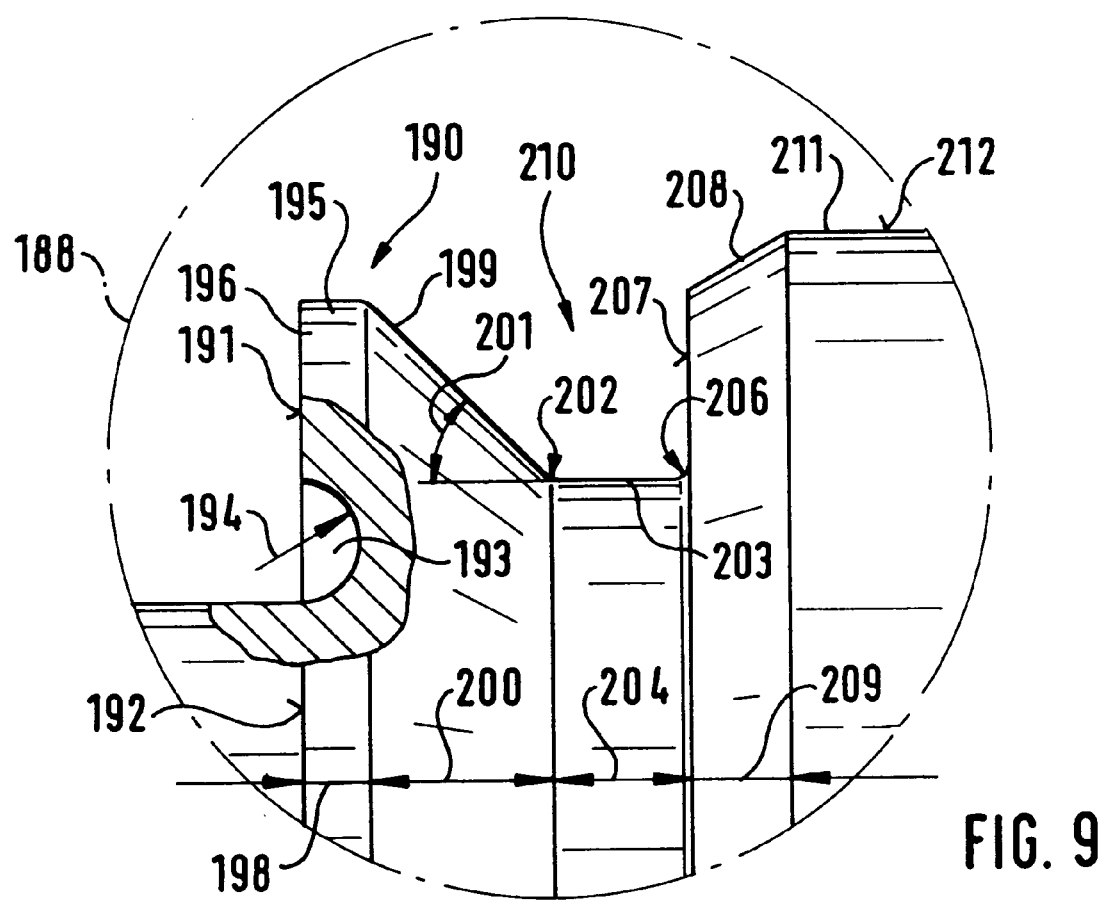
FIG. 9 is a highly enlarged view of the detail designated with the reference numeral 188 in FIG. 7.
Figure 10:
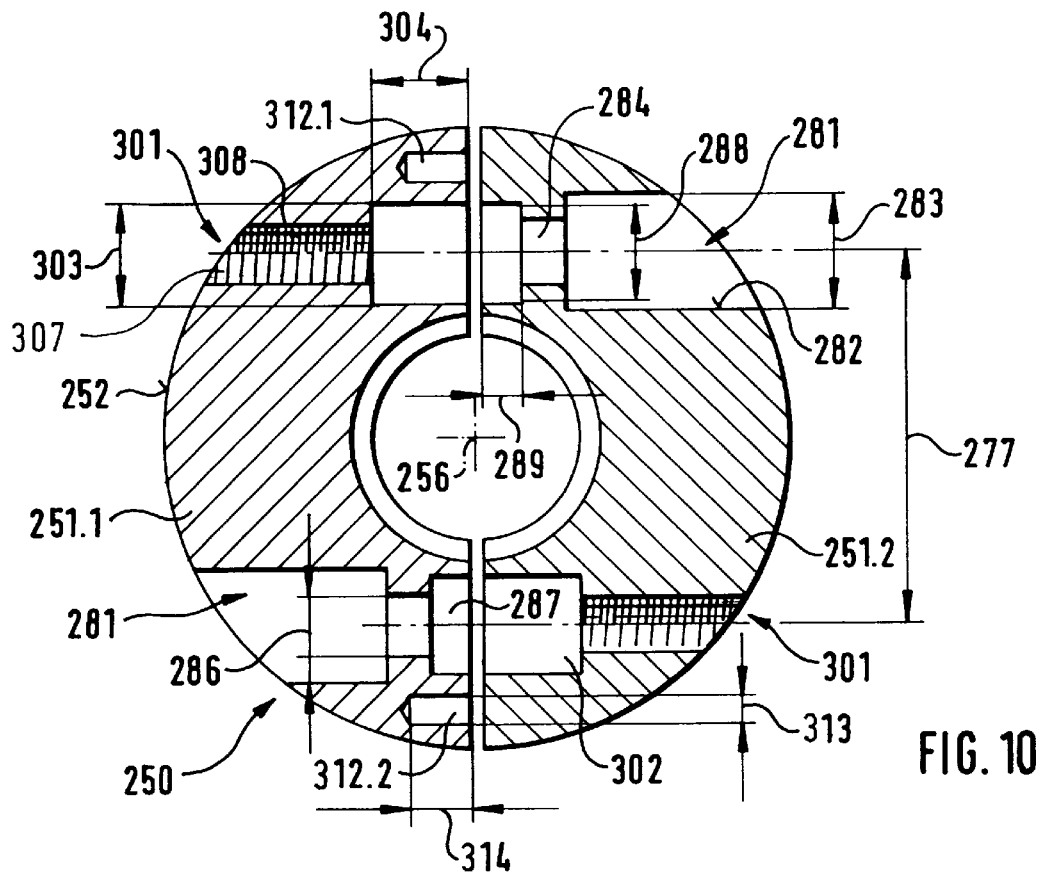
FIG. 10 is a cross-section through the two half shells of the clamping coupling.
Figure 11:
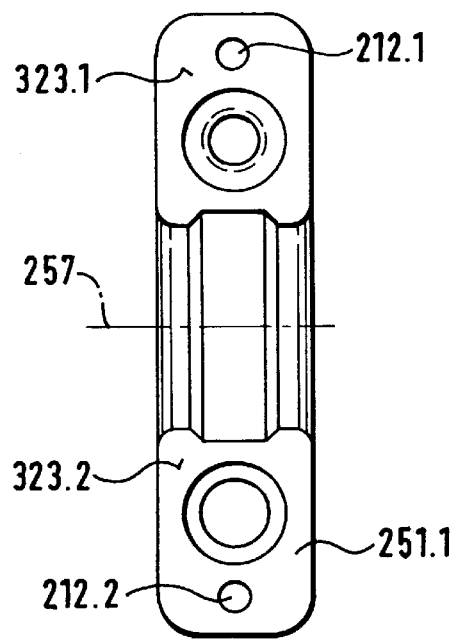
FIG. 11 is a longitudinal plan view of the half shell of the clamping coupling shown on the left in FIG. 10.
Figure 12:
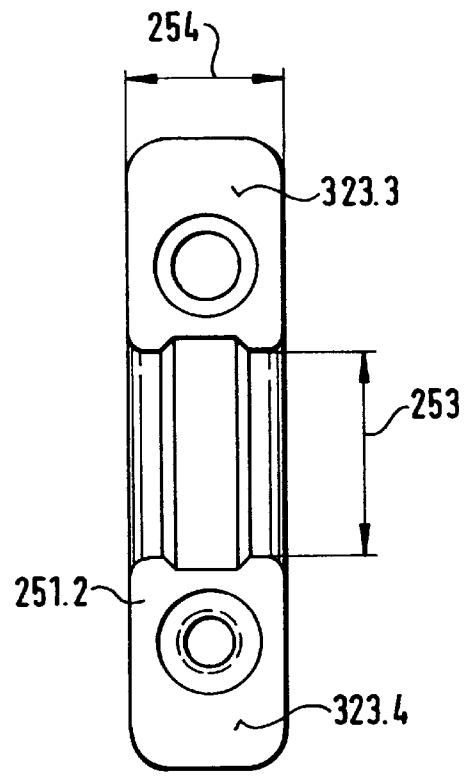
FIG. 12 is a plan view of the half shell of the clamping coupling shown on the right in FIG. 10.

The pump 20 has a housing 21 with an inlet 22 and an outlet 23. A pump operating chamber 24 with a pump duct 25, an intake chamber 26, a conveying area 27, and an outlet chamber 28 are formed in the pump 20. A rotor 80 which runs in it has a shaft 81 and a pump element 90. The rotor 80 is driven by the drive shaft 180 and is detachably connected thereto by means of the clamping coupling 250. In addition, one or more sealing slides 31 acting as shut-off members are provided.

The housing 21 has a pump connection 36 which is formed by the base 37 and the flange 38 rising above the base 37 and joined to the base in a manner not shown in detail. The housing 21 further contains the flange-shaped annular housing part 39 comprising the coupling-assembly chamber 32 and connected to the flange 38 in a manner not shown in detail. The cup-shaped housing part 40 is connected to the annular housing part 39 likewise in a manner not shown in detail. The cup-shaped housing part 40 is constructed with the wall portion 67, formed parallel to the rotational axis 76 of the pump, and the wall portion 66, which is arranged at a right angle thereto and which separates the pump operating chamber 24 from the coupling-assembly chamber 32. The housing cover 41 is attached to the housing part 40, and is detachably connected to the housing part 40 by means of the bolts 42. The bolts 42 have an hexagonal bolt head with a width across 62. The pump operating chamber 24 is sealed off from the housing cover 41 by means of an O-ring 69. The bearing sleeve 43 is provided on the side of the flange 38 remote from the annular housing part 39, and is detachably connected to the flange 38 by means of the bolts 55. The housing cover 45 is attached to the bearing sleeve 43, and is detachably connected to the bearing sleeve 43 by means of the bolts 44.

In the upper area for the inlet 22 a cylindrical inlet connection 46 and a cylindrical outlet connection 47 with attachment threads 46.1 and 47.1 for screwing on pipe-lines are provided in the cup-shaped housing part 40. They have a cylindrical inlet bore 46.2 and a cylindrical outlet bore 47.2. The bores 46.2 and 47.2 open through corresponding apertures in the cup-shaped housing part 40 into the intake chamber 26 and the outlet chamber 28. The intake chamber 26 and the inlet 22 represent the suction side and the outlet chamber 28 and the outlet 23 represent the pressure side.

The sealing slides 31, designed as shut-off members, are used for sealing off the undulating boundary faces 96.1 and 96.2 of the pump element 90 between the intake chamber 26 and the outlet chamber 28. They have the basic shape of substantially cuboid elements. In order that the sealing slides 31 can follow the undulating boundary faces 96.1 and 96.2 of the pump element, they have to be guided in a sealed-off manner which permits a straight movement. For this purpose the sealing slides 31 are guided in the slide-guiding part 71. The slide-guiding part 71 has a partially cylindrical external shape and is arranged in a guiding-part receiving bore 72 in the cup-shaped housing part 40. It has a continuous slide slot 78 which is open at the ends and in which are formed the flat slide faces which are substantially rectangular in cross-section, parallel to each other and formed parallel to the rotational axis 76 of the pump. Their sealing faces 73 which seal off the undulating boundary faces 96.1 and 96.2 of the pump element 90 are made circular cylindrical in this case, but numerous other shapes of the sealing faces 73 are possible depending upon the size conditions of the pump 20, the shape of the boundary faces 96.1, 96.2 of the pump element 90 and the required sealing conditions. A yoke spring 74, which is produced from round wire and the ends 74 of which engage in grooves at the rear of the sealing slides 31, are associated with the two sealing slides 31 which in this case are identically shaped.

One respective aperture 77 leads in each case from the outlet chamber 28 through the two ends of the slide-guiding part 71 into the slide slot 78, so that the medium presses against the sealing slides 31 from the rear and the sealing slides 31 can press with their sealing face 73 against the boundary faces 96.1 and 96.2. The yoke spring 74, which presses the two sealing slides 31 against the boundary faces 96.1 and 96.2 so as to compensate for wear and for satisfactory sealing, is thereby assisted.

The conveying area 27 of the pump duct 25 is bounded here by the exchangeable parts 33.1 and 33.2. The exchangeable parts 33.1 and 33.2 are made L-shaped in longitudinal cross-section as similar components, preferably of plastics material or rubber, and are arranged in a mirror-inverted manner with respect to each other. The use of exchangeable parts 33.1 and 33.2 of this type is advantageously possible for those pumps which can be cleaned with suitable rinsing or cleaning agents at temperatures below approximately 100° C. in accordance with the hygienic requirements. With higher hygienic requirements, in particular if aseptic conveying conditions are required, rinsing and cleaning conditions can occur in conjunction with temperatures above 100° C., for example when cleaning or rinsing with superheated steam. For applications of this type the exchangeable parts can be dispensed with and instead the cup-shaped housing part 40 and where appropriate the housing cover 41 can be shaped in a suitable manner so as to form the conveying area 27 of the pump duct 25.

The rotor 80 is preferably constructed integrally with the rotor shaft 81 and the pump element 90. The rotor 80 is produced for example by casting or forging with subsequent machining by milling. The rotor shaft 81 is formed with the circular cylindrical shaft bearing journal 87, the cylindrical shaft body 85, the circular cylindrical support member 111, and the circular cylindrical driving sleeve 86 and has a length 84 which is adapted to meet the size and stress conditions of the pump with respect to the necessary bearing and sealing conditions. The bearing journal 87 has an external diameter 91 and a width 92 which is shaped in an optimum manner to meet the bearing conditions. The bearing journal 87 is provided at its free end 82 with the central tool attachment head 107 preferably formed integrally therewith. The tool attachment head 107 is constructed in this case with a hexagon with the width across 108 which corresponds to the width across 62 of the bolts 42 which secure the housing cover 41, so that in both cases the same assembly or operating tool can be used.

With the aid of a tool of this type, for example a crank wrench, which engages on the tool attachment head 107, the rotor can be rotated manually, in order to move the shells 250.1, 250.2 of the clamping coupling into a position suitable for their dismantling or assembly.

With its partial external diameter 99 the wall portion 102 of the shaft body 85 extending parallel to the rotational axis 79 of the rotor adjoins the bearing journal 87. It has a width 89. The transition from the bearing journal 87 to the shaft body 85 is formed with the radius of curvature 88. The disc-shaped pump element 90 constructed with undulating boundary faces 96.1 and 96.2 extends radially outwards from the rotor shaft 81. It has a circular cylindrical peripheral boundary face 97 with the external diameter 98 and is formed with the collar 95 having the width 94. The pump element 90 is preferably integrally joined to the shaft body 85. The side of the shaft body 85 remote from the end 82 is formed with the end face 101 orientated at a right angle to the rotational axis 79 of the rotor. On the side facing the end face 101 the said shaft body 85 is provided with the annular groove 103 which is made rectangular in cross-section. The annular groove 103 has the external diameter 105, the internal diameter 106 and the depth 104. The support member 111, the external diameter 112 of which corresponds to the internal diameter 106 of the axial annular groove 103, is attached to the shaft body 85. The bevel 114 and the driving sleeve 86 with its external diameter 116 adjoin the support member 111.

The rotor shaft 81 is provided at its end 83 with the rotor-shaft attachment element 125 formed by axial end engagement structures. The rotor-shaft attachment element 125 is formed by the clamping cone 140, the annular groove 130 and the slots 155.1, 155.2, 155.3.

The annular groove 130 is bounded by the wall portion 131 formed at a right angle to the rotational axis 79 of the rotor, the axially parallel wall portion 133 and the oblique wall 137. The wall portion 131 passes with the radius 132 into the axially parallel wall portion 133 which has a width 134. The wall portion 133 passes with the radius 136 into the oblique wall 137 which forms an angle 138 of approximately 45° with the rotational axis 79 of the rotor or a straight line parallel thereto. In this case the oblique wall 137 extends over a width 139. The axially parallel wall portion 141 of the offset 142, which has a width 143, adjoins the oblique wall 137. The offset 142 is bounded by the end face 145 of the abutment wall 146 formed at a right angle to the rotational axis 79 of the rotor.

The slots 155.1 to 155.3 arranged offset from one another about the rotational axis 183 of the shaft at an equal distance by the angles 159.1; 159.2; 159.3 in accordance with their number, in which case the angles 159.1 to 159.3 each amount to approximately 120° here.

The slots 155.1; 155.2; 155.3 have a width 156 and a depth 158. At their end remote from the end 83 of the rotor shaft 81 the slots 155 are rounded off with the radius 157.

The rotor shaft 81 has a circular cylindrical bore 149 with the internal diameter 151. The bore 149 extends in the axial direction parallel to the rotational axis 79 of the rotor as far as below the shaft body 85 and terminates in the region of the shaft body 85.

The drive shaft 180 is made circular cylindrical and comprises the guide shaft 181, the attachment element 185 and the shaft 224. The guide shaft 181 is made circular cylindrical with the external diameter 182 which is only slightly smaller than the internal diameter 151 of the bore 149 of the rotor 80 and has a length 186 which is smaller than the length of the bore 149 extending through the rotor 80. The guide shaft 181 is adjoined by the drive-shaft attachment element 185 which is formed with axial end engagement structures and which is made substantially in the same way as the rotor-shaft attachment element 125 of the rotor 80. It is formed with the clamping cone 190, the annular groove 210 and the rotation-preventing grooves 231.1, 231.2, 231.3 with adapted feather keys 242.1; 242.2; 242.3 inserted therein.

The clamping cone 190 comprises the abutment wall 192 bounded by the end face 191 formed at a right angle to the rotational axis 183 of the drive shaft 180. The abutment wall 192 is provided with the annular release groove 193 formed with the radius 194 at the transition from the guide shaft 181 to the clamping cone 190.

The axially parallel wall portion 195 of the offset 196 is formed at a right angle to the abutment wall 192. The offset 196 has a width 198 and an external diameter 197 which corresponds to the external diameter 147 of the offset 142 of the clamping cone 140 of the rotor 80. The offset 196 is adjoined by the oblique wall 199 which, with the rotational axis 183 of the shaft or a straight line parallel thereto, forms the angle 201 which amounts to approximately 45°. The oblique wall 199 has the width 200. It passes with the radius 202 into the axially parallel wall portion 203 of the annular groove 210, which has the width 204 and the external diameter 205. The axially parallel wall portion 203 passes with the radius 206 into the wall portion 207 formed at a right angle to the rotational axis 183 of the shaft. The bevel 208 with the width 209, which passes into the axially parallel wall portion 211 of the support shoulder 214, adjoins the wall portion 207. The support shoulder 214 has an external diameter 215 and a width 216. The support shoulder 214 is bounded by the wall portion 217 extending at a right angle to the rotational axis 183 of the shaft. The wall portion 217 passes into the axially parallel bearing part 218 which has a width 219 and an external diameter 221. The bevel 223 adjoins the bearing part 218. The part of the shaft 224 adjoining the bevel 223 has an external diameter 226.

The rotation-preventing grooves 231.1 to 231.3 have a width 232 which corresponds to the width 156 of the slots 155.1; 155.2; 155.3 in the rotor shaft 81 and have a length 234 which is greater than their width 232. The rotation-preventing grooves 231.1; 231.2; 231.3 are rounded off at their longitudinal ends with the radius 236.1, 236.2.

In addition, the rotation-preventing grooves 231.1; 231.2; 231.3 have a depth 235. The rotation-preventing grooves 231.1, 231.2, 231.3 are arranged in their axial position in such a way that their longitudinal axis extends parallel to the rotational axis 183 of the shaft, their radius center 237.1 is situated in the plane formed by the end face 191 of the clamping cone 190 and their radius center 237.2 is situated between the end face 191 and the end 187 of the drive shaft 180.

In accordance with the arrangement of the slots 155.1; 155.2; 155.3 the rotation-preventing grooves 231.1; 231.2; 231.3 are arranged about the rotational axis 183 of the shaft by an angle 233.1; 233.2; 233.3 of 120° in this case which corresponds to their number. The external dimensions of the feather keys 242.1; 242.2; 242.3 are slightly smaller up to their height 243 than the internal dimensions of the rotation-preventing grooves 231.1; 231.2; 231.3. The height 243 is smaller than or the same size as half the difference between the external diameter 116 of the driving sleeve 86 and the internal diameter of the bore 149 plus the groove depth 235.

The drive shaft 180 is mounted in the bearing sleeve 43 by means of the axial roller bearings 51 and 52 in such a way as to prevented it from being displaced axially. In this case the axial roller bearing 51 is supported radially on the bearing part 218 and axially on the vertical wall portion 217 of the support shoulder 214. On the other side the axial roller bearing 51 is supported radially and axially on the bearing sleeve 43. The bearing sleeve 43 has a bearing shoulder 48 for axial support. The other axial roller bearing 52 is supported radially on the shaft 224 and is supported axially on a nut 50 which is secured to the shaft 224 and which is used for adjusting the pre-stressing of the axial roller bearings 51, 52. On the other side the axial roller bearing 52 is supported radially and axially on the bearing sleeve 43. The bearing sleeve 43 has the bearing shoulder 49 for axial support.

The radial shaft-sealing ring 53 is provided in order to seal off the coupling-assembly space 32 from the bearing chamber 56. The radial shaft-sealing ring 53 is supported on the bearing sleeve 43 and is prevented from being displaced axially in the direction towards the axial roller bearing 51 with the aid of the retaining ring 54 attached there. On the other side the radial shaft-sealing ring 53 rests against the support shoulder 214 of the drive shaft 180 in a sealing manner.

In the region of the bearing chamber 56 present between the two axial roller bearings 51 and 52 the bearing sleeve 43 is provided with the discharge bore 57 which can be closed in a sealed manner by means of the bolt 58. The bearing chamber 56 is sealed off towards the outside by means of the radial shaft-sealing ring 59 which on one side is supported on the inner periphery of the bore 61 provided in the housing cover 45 and which on the other side rests in a sealed manner against the shaft 224.

In the assembled state the rotor 80 with the axial bore 149 is mounted on the guide shaft 181 of the drive shaft 180 so that on the one hand the rotational axis 79 of the rotor and the rotational axis 183 of the shaft, forming the rotational axis 76 of the pump, are precisely in alignment with each other, and on the other hand the rotor 80 is secured to the guide shaft 181 in such a way as to prevented it from being displaced axially. In order to achieve a clearance-free seating of the rotor 80 on the guide shaft 181 the external diameter 182 of the guide shaft 181 and the internal diameter 151 of the bore 149 in the rotor 80 are adapted to each other so as to form a clearance fitting.

In order to prevent rotation between the drive shaft 180 and the rotor 80, numerous alternative designs can be provided, which are adapted to the respective size conditions of the pump and the respective stress situation while avoiding peaks of stress. In the embodiment illustrated here the feather keys 242.1; 242.2; 242.3 inserted in the rotation-preventing grooves 231.1; 231.2; 231.3 of the drive shaft 180 engage with positive locking in the assembled state in the slots 155.1; 155.2; 155.3 formed accordingly in the rotor shaft 81. This design is preferably used in the case of larger pumps. In the case of smaller pumps for example the feather key can be dispensed with and a slightly lengthened rotor shaft 81 can be provided instead, in which case the slots 155.1 to 155.3 are substantially widened, so that the rotor shaft 81 has stub-shaped entrainment tabs. The tabs engage in matching grooves in the drive shaft 180, in which case the grooves penetrate the clamping cone 190.

Figure 15:
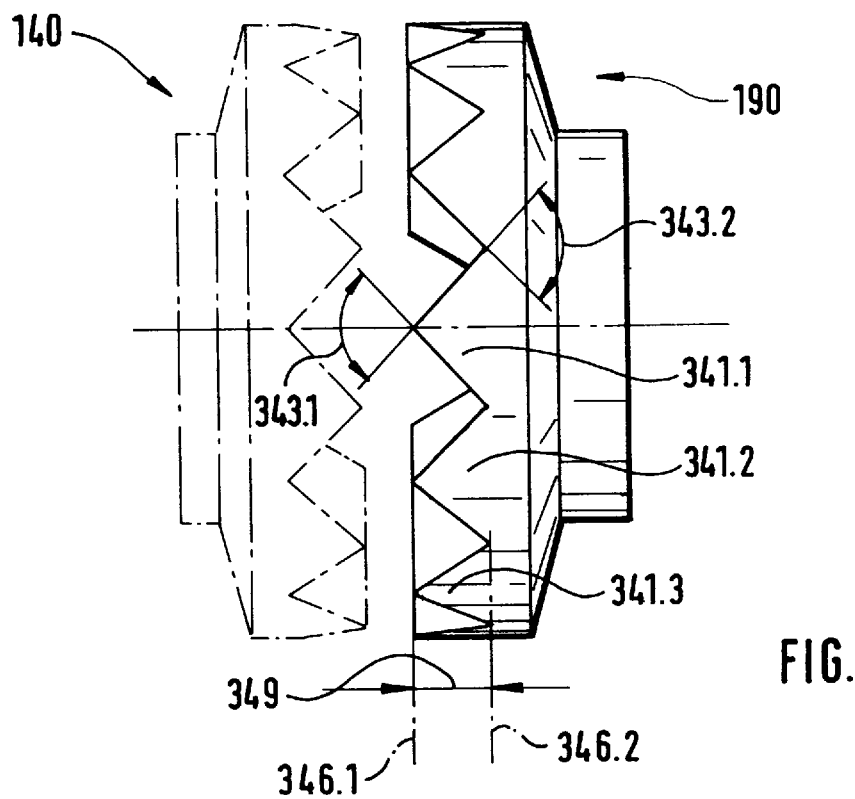
FIG. 15 shows an advantageous embodiment of the attachment-element arrangement in the region of the respective ends of the rotor shaft and the drive shaft with serrated surface profiles engaging in each other with positive locking.
Figure 16:
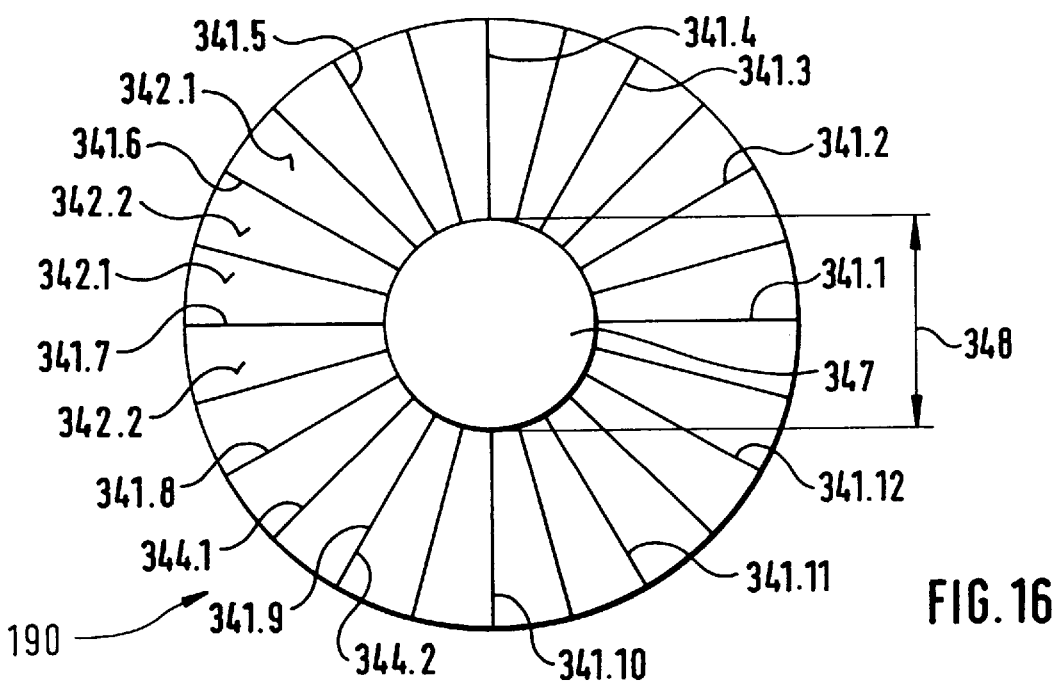
FIG. 16 is a plan view of the clamping cone shown on the right in FIG. 15.

A further alternative of the rotation prevention between the drive shaft 180 and the rotor 80 is shown in FIGS. 15 and 16. In this case the clamping cones 140 and 190 are not designed with the end faces 145 and 191 respectively formed at right angles to the rotational axis 79 of the rotor and the rotational axis 183 of the shaft respectively as described above, but serrated surface structures arranged around the rotational axes 79 and 183 of the rotor and the shaft respectively and engaging in each other with positive locking are provided. In this case a plurality of teeth 341.1 to 341.12 are formed which are triangular in cross-section and which are bounded by substantially trapezoidal boundary faces 342.1 and 342.2 bounded by straight radial boundary edges 344.1, 344.2. The boundary faces 342.1 and 342.2 are each arranged at an angle 343.1 and 343.2—which in this case amounts to approximately 45°—to each other and to the respectively adjacent boundary faces 342.2 and 342.1 respectively. The straight boundary edges 344.1 and 344.2, which extend radially and are formed by the intersection of the adjacent boundary faces 342.1, 342.2, are each situated in a boundary plane 346.1 and 346.2 at right angles to the rotational axes 79 and 183 of the rotor and the shaft respectively. The boundary faces 342.1 and 342.2 of the teeth 341.1 to 341.12 are bounded on the inside by the circular flat base face 347 which is situated substantially at the level of the boundary plane 346.2. It has a diameter 348 which in this case amounts to approximately a third of the diameter 147 and 197 of the clamping cones 140 and 190 respectively.

The width 143 and 198 of the offsets 141 and 195 of the clamping cones 140 and 190 respectively is greater than the tooth depth or the distance 349 between the two boundary planes 346.1 and 346.2 and is adapted accordingly to the size conditions, and the loading and strength conditions.

The clamping cones 140 and 190 provided with the teeth 341.1 to 341.12 are shaped identically, on the one hand in order to ensure a trouble-free prevention of rotation with positive locking and on the other hand in order to permit the use of symmetrically shaped half shells of the clamping coupling, as have already been described and shown in FIGS. 10 to 14.

The rotor 80 is mounted radially at its free end essentially in the region of the bearing journal 87 which is supported on the sliding bearing ring 160. The sliding bearing ring has a width 161 which is slightly larger than the width of the bearing journal 87 and has an internal diameter 163 which is slightly larger than the external diameter 91 of the bearing journal 87. In addition, the sliding bearing ring has an external diameter 162 which is slightly smaller than the internal diameter of the bore 63. On its side facing the pump element 90 the sliding bearing ring 160 is rounded off on the inner edge with a radius 164 which is larger than the radius 88 at the transition between the bearing journal 87 and the wall portion 102 of the shaft body 85. The sliding bearing ring 160 is supported on one side on the bore 63 provided in the housing cover 41 and on the other side on the exchangeable part 33.1 as well as on the sealing slide 31.

The pump operating chamber 24 is sealed off from the coupling assembly chamber 32 on the rotor side by means of the radial shaft-sealing rings 166, 167 and 168. The sealing rings 166, 167 and 168 are located inboard of the clamping coupling 250 and prevent contaminants from entering the shaft operating chamber 24 from the outboard side where the clamping coupling is located. The said radial shaft-sealing rings 166, 167 and 168 rest against the rotor shaft 81 in a sealed manner on one side and are supported on the supporting and bearing sleeve 173 on the other side. The supporting and bearing sleeve 173 is arranged in such a way that it extends on one side into the pump operating chamber and on the other side into the coupling assembly chamber 32. The radial shaft-sealing ring 168 is provided in the region of the end 174 of the part of the supporting and bearing sleeve 173 projecting into the coupling assembly chamber 32 and it is supported there on the supporting shoulder 241. The radial shaft-sealing rings 167 and 166 are provided in the region of the opposite end 175 of the supporting and bearing sleeve 173 projecting into the pump operating chamber 24. In this case the radial shaft-sealing ring 166 is supported on the radial shaft-sealing ring 167 by way of the spacer ring 238.1, and the radial shaft-sealing ring 167 is supported on the supporting shoulder 239 of the supporting and bearing sleeve 173 by way of the spacer ring 238.2. In this way a rinsing chamber 179 is formed between the radial shaft-sealing ring 168—provided on the side of the coupling and assembly chamber—and the radial shaft-sealing ring 167—provided on the side of the pump operating chamber.

The rinsing chamber 179 is connected by way of rinsing ducts or bores (not shown here) to suitable screw fastenings acting as attachments and/or closure means (likewise not shown).

The shaping of the sealing of the pump operating chamber 24 and the support thereof is not restricted to the embodiment shown, but designs adapted to the respective size and structural shape of the pump as well as pressure and medium conditions can be provided, for example with sliding ring seals in various designs and arrangements.

The supporting and bearing sleeve 173 is made circular cylindrical and is supported in a radial manner substantially on the cup-shaped housing part 40, but it also rests against the exchangeable part 33.2 as well as against the sealing slide 31. In order to fix the supporting and bearing sleeve 173 axially, it has a retaining ring 176 which is arranged in the coupling assembly chamber and which rests against the cup-shaped housing part 40. In addition, the supporting and bearing sleeve 173 is prevented from rotating in a manner not shown in detail.

The supporting and bearing sleeve 173 rests with its end face present in the pump operating chamber 24 against the bearing ring 169 which is L-shaped in cross-section. The bearing ring 169 has a circular cylindrical supporting part 171 which is pressed into the axial annular groove 103 of the shaft body 85 and is provided on the other side with a bearing part 172 likewise made circular cylindrical. The supporting part 171 and the bearing part 172 are preferably constructed in one piece. The bearing part 172 has an external diameter which corresponds to the external diameter of the supporting and bearing sleeve 173.

The pump operating chamber 24 is sealed off on the side of the supporting and bearing sleeve from the coupling assembly chamber 32 by means of an O-ring 177 which is fastened in the annular groove 178 which is arranged in the region of the bore 68 provided in the wall portion 66 of the cup-shaped housing part 40.

A disc-shaped clamping coupling 250 engaging over the two clamping cones 140 and 190 and acting as a clamping and connecting device is provided in order to fasten the drive shaft 180 to the rotor 80 in a secure and clearance-free manner resistant to centrifugal force. It is constructed with clamping and connecting arms which in this case are formed with the two semi-annular half shells 251.1 and 251.2 of the clamping coupling which are shaped virtually identically. The half shells 251.1 and 251.2 have the external diameter 252, the internal diameter 253 and the thickness 254, which are designed in accordance with the load conditions, the pump size and the fitting conditions. The cylindrical annular groove 258, which is trapezoidal in cross-section and is open towards the center 256 of the partial circle or towards the longitudinal axis 257 of the disc and which is shaped as a groove-like free space for engagement, is formed in each case in the respective inner wall 255 of the said half shells 251.1 and 251.2.

Figure 13:
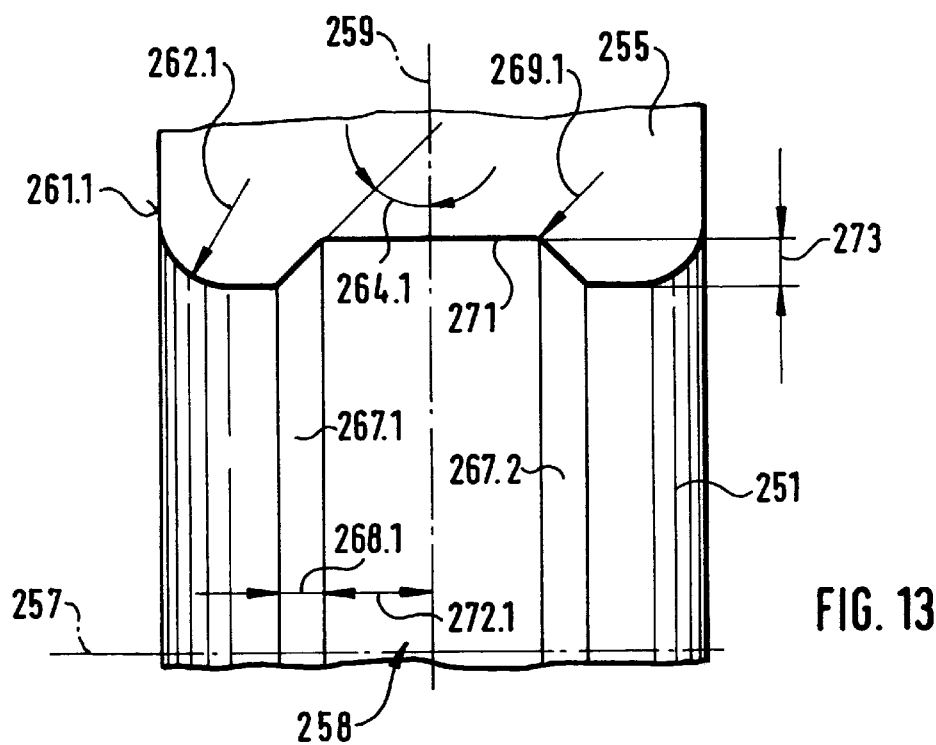
FIG. 13 is a highly enlarged cut-away view of the attachment-element arrangement of the half shells of the clamping coupling shown in FIGS. 11 and 12 respectively.
Figure 14:
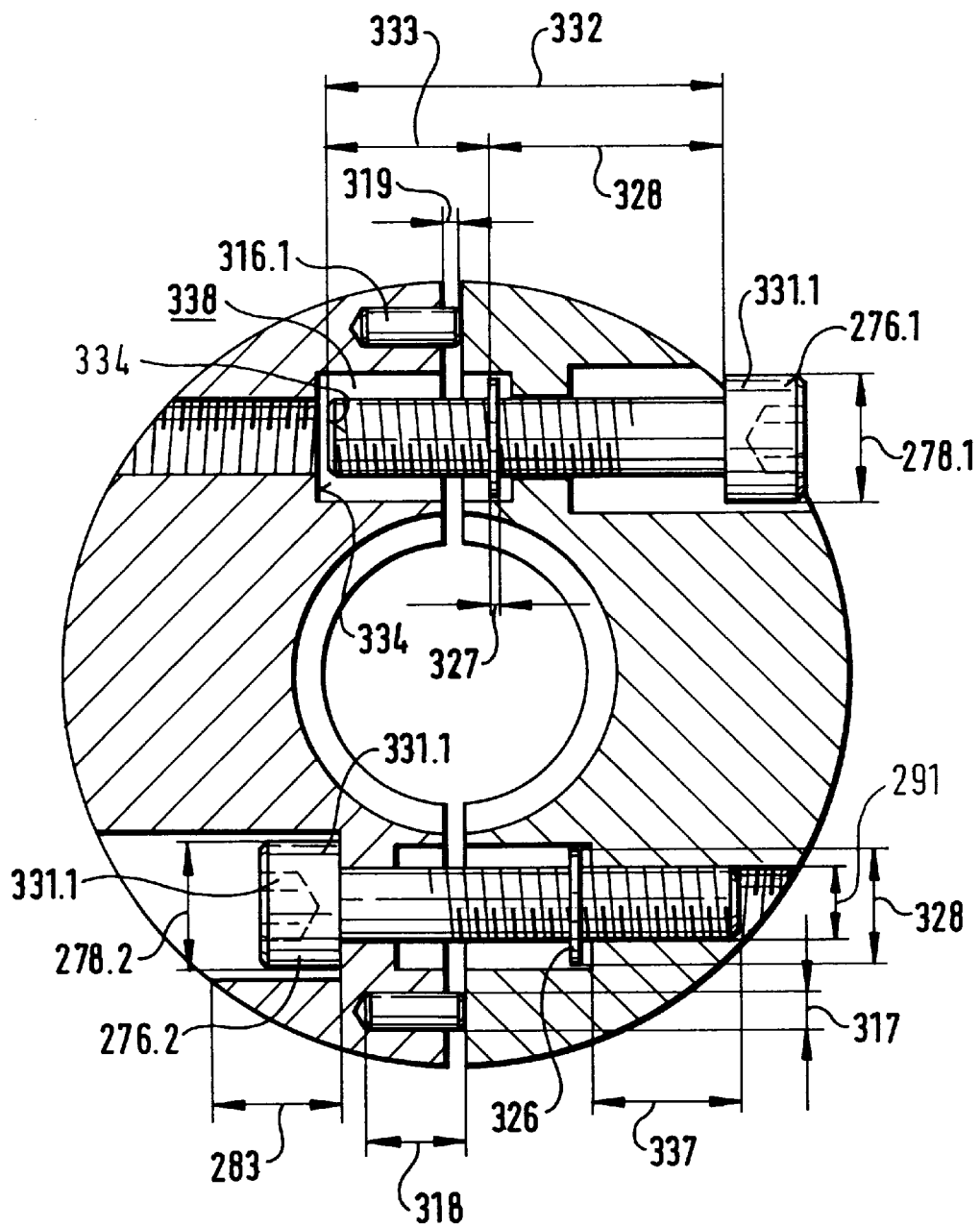
FIG. 14 is a cross-section through the half shells of the clamping coupling with fitting spacer pins and connexion bolts to illustrate the assembly conditions.

The exact shape of the attachment element is best seen from FIG. 13. As is evident, the half shells 251 of the clamping coupling are shaped symmetrically with respect to the median plane 259 extending at a right angle to the longitudinal axis 257 of the disc in the longitudinal plan view shown in FIG. 13. For this reason the description of the wall shapes is given essentially only for the wall portions situated on the left of the median plane 259 in FIG. 13. Starting from the lateral wall 261.1 arranged at a right angle to the longitudinal axis 257 of the disc, the lateral wall 261.1 passes into the axially parallel wall portion 263.1 of the inner wall 255 with the radius of curvature 262.1.

The oblique wall 267.1 which forms the angle 264.1 of 45° with the median plane 259 is attached to the inner wall 255 on the outside, i.e. at an increasing distance from the longitudinal axis 257 of the disc. The oblique wall 267.1 has a longitudinal width 268.1. It passes with the radius of curvature 269.1 into the groove-boundary wall 271 which extends parallel to the longitudinal axis 257 of the disc and of which half the width 272.1 is smaller than the width 143 and 198 of the offsets 142 and 195 of the clamping cones 140 and 190 respectively. This ensures that in the assembled state the two half shells 251.1 and 251.2 of the clamping coupling touch the clamping cones 140 and 190 exclusively with their oblique walls 267.1 and 267.2, so as thereby to achieve an optimum clamping effect. For the same reasons the annular groove 258 has a depth 273 which is smaller than half the difference between the external diameter 147 and 197 of the offsets 141 and 195 of the clamping cones 140 and 190 respectively and the external diameter 135 and 205 of the horizontal wall portions 133 and 203 of the annular grooves 130 and 210 of the rotor shaft 81 and the drive shaft 180 respectively. In addition, for the same reason, the thickness 254 of the half shells 251.1 and 251.2 of the clamping coupling are dimensioned in such a way that it is less than the sum of the distances 134, 139 and 143 or 198, 200 and 204 or it is less than the sum of the distances between the wall portion 131 and the abutment wall 146 of the rotor-shaft attachment element 125 formed at a right angle to the rotational axis 79 of the rotor, or the wall portion 207 and the abutment wall 192 of the drive-shaft attachment element 185.

The two bolts 276.1 and 276.2 are provided for assembling and fastening the two half shells 251.1 and 251.2 of the clamping coupling. The bolts 276.1 and 276.2 are provided in this case as recessed-head bolts formed with an hexagonal recess. If the size conditions allow it, the bolts 276.1 and 276.2 can also be formed with an hexagonal head with the same wrench width in accordance with the bolts 42 or the tool-attachment head 107.

The choice of the bolts 276.1 and 276.2 and 42 and of the tool-attachment head 107 is not restricted in principle to specific bolt shapes, but the tool-engagement dimensions of these bolts are advantageously selected to be equally large, so that only one tool or one type of tool is required for the assembly or dismantling of the pump 20. This affords advantages during the operation and in terms of minimizing the number of tools required.

In order to receive the bolts 276.1 and 276.2 the two half shells 251.1 and 251.2 of the clamping coupling are each provided with the two bores 281 and 301 which are arranged in a mirror-symmetrical manner with respect to the center 256 of the partial circle and which extend at a distance 277 parallel to each other and at right angles to the end faces 323.1 to 323.4. In this case one respective bore 281 is opposite one bore 301 in each case in the assembled state. Both the bore 281 and the bore 301 are constructed as continuous bores open on both sides. The bores 281 are formed with the portions 282 which have an internal diameter 283 which is larger than the head diameter 278.1 and 278.2 of the bolts 276.1 and 276.2 respectively. In this case the depth of the bore portions 282 should be dimensioned in such a way that their smallest depth 283 is larger than the head height 279 of the bolts 276.1 and 276.2. This ensures that the bolt heads 331.1, 331.2 are sunk completely inside the half shells 251.1 and 251.2 of the clamping coupling in the assembled or tightened state and consequently do not project in a troublesome manner.

The bore portion 282 has attached thereto a guide bore 284, the diameter 286 of which is slightly larger than the thread diameter 291 of the two bolts 276.1 and 276.2. A bore 287 adjoins the guide bore 284. The bore 287 has a diameter 288 which is larger than the diameter 286 of the guide bore 284 and has a depth 289. The bore 301 opposite the bore 281 in the assembled state is provided, in its portion opposite the bore 287, with the bore portion 302. The bore portion 302 has a diameter 303 which corresponds to the diameter 288 of the bore 287. It has a depth 304 which corresponds approximately to the screw-in depth of the bolts 276.1 and 276.2. The bore portion 302 has adjoining it a threaded bore 307, which is provided with an internal thread 308 matching the bolts 276.1 and 276.2.

In addition, the two fitting bores 312.1 and 312.2, which are situated in the median plane 259 at an equal distance from the longitudinal axis 257 of the disc and which have a diameter 213 and a depth 214, are provided in one half shell 251.1 of the clamping coupling. The fitting bores 312.1 and 312.2 are used for receiving fitting spacer pins 316.1 and 316.2 which are pressed into the corresponding fitting bore 312.1, 312.2 in the assembled state. The fitting spacer pins 316.1 and 316.2 therefore have a diameter 317 which is slightly larger than the diameter 313 of the fitting bores 312. In addition, the fitting spacer pins 316 have a length 318 which is slightly greater than the depth 314 of the fitting bores 312. In this way, the fitting spacer pins 316 project by a slight distance 319 from the end faces 321.1 and 321.2 situated at right angles to the median plane 259. This ensures that when the bolts 276.1 and 276.2 are assembled or tightened the half shells 251.1 and 251.2 of the clamping coupling are prevented from tilting.

In order to prevent the bolts 276.1 and 276.2 from being lost during the dismantling of the half shells 251 of the clamping coupling, the bolts 276.1 and 276.2 inserted through the guide bore 384 each have a respective loss-preventing ring 326. The loss-preventing rings 326 are constructed in the form of a disc with a thickness 327 and an external diameter 328 which can be smaller or even slightly larger than the diameter 288 or 303 of the bore 287 or the bore portion 302 respectively, depending upon the material of the loss-preventing ring 326 used. If, as in the present case, a plastics-material disc is used, its external diameter 328 can be slightly larger than the bore diameter 288 and 303 respectively, so that the bolts 276.1 and 276.2 will remain in their position after the unscrewing. The loss-preventing rings 326 are for example pressed against the bolts 276.1 and 276.2, as in the case for example of the plastics-material bolts present here, but they can also be fastened to the bolts 276.1 and 276.2 by other means known in the case of loss-preventing rings. The loss-preventing rings are arranged at a distance 329 from the bolt heads 331.1 and 331.2. In conjunction with the bolt length 332 this results in a distance 333 from the end face 334 of the bolts 276.1 and 276.2 which is larger than the screw-in depth 337 of the bolts 276.

In order to ensure a movement of the loss-preventing rings 326—which is free of longitudinal stops—inside the displacement chambers 338 formed by the bores 288 and the bore portions 302, the bore depths 289 and 304 are accordingly adapted to the screw-in depth 237 in the assembled state in conjunction with the distance 319 between the two half shells 251.1 and 251.2 of the clamping coupling.

In the assembled state the two half shells of the clamping coupling engage over the two clamping cones 140 and 190 with their annular groove 258 formed by the oblique walls 267.1; 267.2 and the groove-boundary wall 271. In this case the oblique walls 267.1; 267.2 of the clamping coupling 250 rest against the oblique wall 137 of the clamping cones 140 of the rotor 80 and the oblique wall 199 of the clamping cone 190 of the drive shaft 180 in such a way, while absorbing predominantly axial forces, that the end faces 191 and 145 of the abutment walls 192 and 146 formed as axial butting structures with flat surface profiles are pressed firmly against each other so as to form a connecting boundary face extending at a right angle to the rotational axis 76 of the pump.

The pump 20 is suitable in particular for conveying media, such as foodstuffs or articles of consumption as well as medicines and cosmetics, upon which high hygienic requirements are made, the media-conveying pump parts having to be thoroughly rinsed or cleaned at specific time intervals and after a stoppage of the pump. For certain applications it may at first be sufficient to rinse the pump operating chamber 24 thoroughly with suitable rinsing agents, for example with water, superheated steam or alcoholic solutions. For this purpose, the pump 20 is advantageously driven for a specific period while conveying the rinsing agent at the same time.

In the present case a satisfactory rinsing effect is assisted by the fact that the pump parts associated with the pump chamber 24 are made relatively simple geometrically and, in particular, without undercutting or troublesome cavities. Since no pump parts which are difficult to clean or which cannot be cleaned completely are arranged in the pump operating chamber 24, contamination of the pumped medium—which would otherwise occur even after a brief operating period—is prevented. This allows a longer uninterrupted operation of the pump 20 which is sufficient for the high hygienic requirements.

After prolonged operation of the pump and/or after a prolonged stoppage of the pump, it is necessary—depending upon the media to be conveyed and the relevant hygienic requirements and legal regulations—for the rotor 80 to be removed from the pump 20 in order to clean completely the pump parts which come into contact with the pumped medium, and—after the pump chamber 24, the slide or slides 31, the exchangeable parts 33.1 and 33.2, the sliding bearing ring 160 and the rotor 80 have been cleaned—for the said rotor 80 to be inserted again. For this purpose the three hexagonal bolts 42 have first to be released with the aid of a suitable tool, for example a fork wrench or a crank socket wrench. It is then possible to remove the housing cover 41 with the O-ring 69 inserted in the end face.

In order to remove the rotor 80 the clamping clutch (coupling) 250 with its half shells 251.1 and 251.2 must be released and removed by releasing the bolts 276.1 and 276.2. The clamping clutch 250 is made accessible by the fact that two substantially opposite openings (not shown) are advantageously provided in the part of the flange-shaped annular housing part 39 accessible from the side. The openings have sufficiently large dimensions to allow the bolts 276.1 and 276.2 to be released by means of a suitable tool and the half shells 251.1 and 251.2 of the clamping coupling to be removed manually.

As a result of the rotational position of the half shells 251.1 and 251.2 of the clamping coupling with the bolts 276.1 and 276.2 which is set at random during the stoppage of the pump, it is necessary to turn the rotor about the longitudinal axis 79 thereof until the bolts 276.1 and 276.2 arrive in a position suitable for dismantling relative to the openings preferably provided on the side of the annular housing part 39. For this purpose the rotor 80 is turned manually about the longitudinal axis 79 thereof, by a suitable tool, preferably the same tool which is used for releasing the bolts 42 of the housing cover 41, being brought into engagement with the hexagonal tool-attachment head 107 provided at the free end 82 of the rotor shaft 81, so that the rotor 80 can then be turned by the rotation of the tool. Following the rotational positioning of the rotor 80 the bolts 276.1 and 276.2 are released completely, so that they are held only by the loss-preventing ring 326.1 or 326.2 respectively. After the bolts 276.1 and 276.2 have been released, the half shells 251.1 and 251.2 of the clamping coupling are removed manually through the openings in the annular housing part 39.

After the half shells 251.1, 251.2 of the clamping coupling have been removed, the rotor 80 can be withdrawn axially in a simple manner together with the sliding bearing ring 160, the sealing slide or slides 31 and the two exchangeable parts 33.1 and 33.2. After that the individual pump parts can be cleaned, in which case the bearing ring 169 as well as the radial shaft-sealing rings 166 to 168 as well as the O-rings 169 and 177 can likewise where appropriate be removed and cleaned or replaced. Finally, the pump chamber 24 open at the front and the coupling assembly chamber 32 can be completely cleaned in a suitable manner, for example by rinsing with water, alcohol or other suitable rinsing media.

The re-assembly of the individual pump parts is then carried out in the reverse sequence.

An important part of the description is reproduced below:

The pump (20) has a rotor (80) rotatable by a drive in a pump duct (25). The rotor (80) has a pump element (90) with undulating boundary faces extending radially. The boundary faces are bounded cylindrically and run in a fitted manner in the cylindrical conveying area (27), their highest points running adjacent to the end faces (35) of the pump duct in a sealed manner. In addition, a sealing slide (31) is provided, which is displaceable parallel to the axis of rotation (76) and which seals off the pump duct (25) between the inlet (22) and the outlet (23), so that during the rotation of the rotor (80) the rotor (80) follows the undulating movement of the boundary faces (96) of the pump element (90). In addition, a sealing is provided which seals off the media-conveying pump chambers from the housing (21). The rotor (80) is detachably connected to the drive shaft (180) while forming connecting boundary faces, in which case the connecting boundary faces are arranged on the side of the drive on the other side of the seal.

List of References:

| | |
|---|---|
| 20 | pump |
| 21 | housing |
| 22 | inlet |
| 23 | outlet |
| 24 | pump operating chamber |
| 25 | pump duct |
| 26 | intake chamber |
| 27 | conveying area |
| 28 | outlet chamber |
| 29 | arrow, sirection of view |
| 31 | sealing slide |
| 32 | coupling assembly chamber |
| 33.1 | exchangeable part |
| 33.2 | " |
| 34 | arrow, direction of view |
| 35 | pump-duct end face |
| 36 | pump connexion |
| 37 | base |
| 38 | flange |
| 39 | annular housing part (flange-shaped) |
| 40 | housing part (cup-shaped) |
| 41 | housing cover |
| 42 | bolt |
| 43 | bearing sleeve |
| 44 | bolt |
| 45 | housing cover |
| 46 | inlet connexion |
| 46.1 | attachment thread |
| 46.2 | inlet bore |
| 47 | outlet connexion |
| 47.1 | attachment thread |
| 47.2 | outlet bore |
| 48 | bearing shoulder |
| 49 | bearing shoulder |
| 50 | nut |
| 51 | axial roller bearing |
| 52 | axial roller bearing |
| 53 | radial shaft-sealing ring |
| 54 | retaining ring |
| 55 | bolt |
| 56 | bearing chamber |
| 57 | discharge bore |
| 58 | bolt |
| 59 | radial shaft-sealing ring |
| 61 | bore |
| 62 | width across |
| 63 | bore |
| 66 | wall portion of 40 |
| 67 | wall portion of 40 |
| 68 | bore (in 40) |
| 69 | O-ring |
| 70 | abutment and sliding face |
| 71 | slide-guiding part |
| 72 | guiding-part receiving bore |
| 73 | sealing face |
| 74 | yoke spring |
| 75 | spring end |
| 76 | rotational axis of pump |
| 77 | aperture |
| 78 | slide slot |
| 79 | rotational axis of pump |
| 80 | rotor |
| 81 | rotor shaft |
| 82 | end of 81 |
| 83 | end of 81 |
| 84 | length of 81 |
| 85 | shaft body |
| 86 | driving sleeve |
| 87 | bearing journal |
| 88 | radius |
| 89 | width of 85 |
| 90 | pump element |
| 91 | diameter of 87 |
| 92 | width of 87 |
| 93 | bearing face |

-continued

List of References:

| | |
|---|---|
| 94 | width of 95 |
| 95 | collar |
| 96 | boundary face |
| 96.1 | " |
| 96.2 | " |
| 97 | peripheral boundary face |
| 98 | external diameter of 86 |
| 99 | partial external diameter of 86 |
| 101 | end face |
| 102 | vertical wall portion of 85 |
| 103 | axial annular groove |
| 104 | depth of 103 |
| 105 | external diameter of 103 |
| 106 | internal diameter of 103 |
| 107 | tool-attachment head |
| 108 | width across |
| 111 | support member |
| 112 | external diameter of 86 |
| 114 | bevel |
| 116 | external diameter of 87 |
| 121 | "detail" |
| 125 | rotor-shaft attachment element |
| 130 | annular groove |
| 131 | wall portion |
| 132 | radius |
| 133 | axially parallel wall portion |
| 134 | width of 133 |
| 135 | external diameter of 133 |
| 136 | radius |
| 137 | oblique wall |
| 138 | angle |
| 139 | width of 137 |
| 140 | clamping cone |
| 141 | axially parallel wall portion |
| 142 | offset |
| 143 | width of 142 |
| 145 | end face |
| 146 | abutment wall |
| 147 | external diameter of 142 |
| 149 | bore |
| 151 | diameter of 149 |
| 155 | slot |
| 155.1 | " |
| 155.2 | slot |
| 155.3 | " |
| 156 | width of 155 |
| 157 | radius |
| 158 | slot depth |
| 159.1 | angle |
| 159.2 | " |
| 159.3 | " |
| 160 | sliding bearing ring |
| 161 | width of 160 |
| 162 | external diameter of 160 |
| 163 | internal diameter of 160 |
| 164 | radius |
| 165 | |
| 166 | radial shaft-sealing ring |
| 167 | " |
| 168 | " |
| 169 | bearing ring |
| 171 | supporting part of 169 |
| 172 | bearing part of 169 |
| 173 | supporting and bearing sleeve |
| 174 | end of 173 |
| 175 | end of 173 |
| 176 | retaining ring |
| 177 | O-ring |
| 178 | annular groove |
| 179 | rinsing chamber |
| 180 | drive shaft |
| 181 | guide shaft |
| 182 | external diameter of 181 |
| 183 | rotational axis of shaft 180 |
| 185 | drive-shaft attachment element |
| 186 | guide length, distance |
| 187 | end |
| 188 | "detail" |

List of References: (continued)

| | |
|---|---|
| 190 | clamping cone |
| 191 | end face |
| 192 | abutment wall |
| 193 | annular release groove |
| 194 | radius of 191 |
| 195 | axially parallel wall portion |
| 196 | offset |
| 197 | external diameter of 196 |
| 198 | width of 196 |
| 199 | oblique wall |
| 200 | width of 199 |
| 201 | angle |
| 202 | radius |
| 203 | axially parallel wall portion |
| 204 | width of 203 |
| 205 | external diameter of 203 |
| 206 | radius |
| 207 | vertical wall |
| 208 | phase |
| 209 | width of 208 |
| 210 | annular groove |
| 211 | axially parallel wall portion |
| 212 | support face |
| 214 | supporting shoulder |
| 215 | external siameter of 214 |
| 216 | width of 214 |
| 217 | axially parallel wall portion |
| 218 | bearing part |
| 219 | width of 218 |
| 221 | external diameter of 218 |
| 223 | bevel |
| 224 | shaft |
| 226 | shaft diameter |
| 231 | rotation-prevention groove |
| 231.1 | " |
| 231.2 | " |
| 231.3 | " |
| 232 | width of 231 |
| 233.1 | angle |
| 233.2 | " |
| 233.3 | " |
| 234 | length of 231 |
| 235 | groove depth |
| 236.1 | radius |
| 236.2 | " |
| 237.1 | radius centre |
| 237.2 | " |
| 238.1 | spacer ring |
| 238.2 | " |
| 239 | supporting shoulder |
| 241 | supporting shoulder |
| 242.1 | feather key |
| 242.2 | " |
| 242.3 | " |
| 243 | height of 242 |
| 250 | clamping coupling |
| 251 | half shell of clamping coupling |
| 251.1 | " |
| 251.2 | " |
| 252 | external diameter |
| 253 | internal diameter |
| 254 | thickness |
| 255 | internal wall |
| 256 | center of partial circle |
| 257 | longitudinal axis of disc |
| 258 | annular groove |
| 259 | medium plane |
| 261.1 | lateral wall |
| 262.1 | radius of curvature |
| 263.1 | axially parallel wall portion of 254 |
| 264.1 | angle |
| 267.1 | oblique wall |
| 267.2 | " |
| 268.1 | longitudianal width |
| 269.1 | radius of curvature |
| 271 | groove-boundary wall |
| 272.1 | half width of 271 |
| 273 | groove depth |
| 276.1 | bolt |
| 276.2 | " |
| 277 | distance |
| 278.1 | head diameter |
| 278.2 | " |
| 279 | head height |
| 281 | bore |
| 282 | bore portion |
| 283 | bore depth |
| 284 | guide bore |
| 286 | diameter of 284 |
| 287 | bore |
| 288 | diameter of 287 |
| 289 | depth of 287 |
| 291 | thread diameter of 276 |
| 301 | bore |
| 302 | bore portion |
| 303 | diameter of 302 |
| 304 | depth of 302 |
| 307 | threaded bore |
| 308 | internal thread |
| 312 | fitting bore |
| 312.1 | " |
| 312.2 | " |
| 313 | diameter of 312 |
| 314 | depth of 312 |
| 316 | fitting spacer pin |
| 316.1 | " |
| 316.2 | " |
| 317 | diameter of 316 |
| 318 | length of 316 |
| 319 | distance |
| 323.1 | end face |
| 323.2 | " |
| 323.4 | " |
| 323.5 | " |
| 326 | loss-prevention ring |
| 327 | thickness of 326 |
| 328 | external diameter |
| 329 | distance |
| 331.1 | bolt head |
| 331.2 | " |
| 332 | bolt length |
| 333 | distance |
| 334 | end face of 276 |
| 337 | screw-in depth |
| 338 | displacement chamber |
| 341.1 | tooth |
| 341.2 | " |
| 341.3 | " |
| 341.4 | " |
| 341.5 | " |
| 341.6 | " |
| 341.7 | " |
| 341.8 | " |
| 341.9 | " |
| 341.10 | " |
| 341.11 | " |
| 341.12 | " |
| 342.1 | boundary face |
| 342.2 | " |
| 343.1 | angle |
| 343.2 | " |
| 344.1 | boundary edge |
| 344.2 | " |
| 346.1 | boundary plane |
| 346.2 | " |
| 347 | base face |
| 348 | diameter of 347 |
| 349 | tooth depth of distance |

I claim:

1. A pump for fluids or fluid-like media, comprising a housing, an inlet, an outlet, a pump operating media conveying chamber with a pump duct, an intake chamber, a conveying region, an outlet chamber, a rotor which has a rotor shaft, a drive for rotating the rotor, the drive being arranged at a drive side and having a drive shaft which is releasably connected to the rotor by connecting boundary faces connected together by a connection device, the rotor having a pump element with a cylindrical external peripheral face and rotating in the pump duct and with undulating boundary faces extending radially from the rotor shaft, wherein the pump duct is cylindrical at least in the conveying region and is provided at least in the conveying region with a pump duct end face against which greatest radial points of the pump element relative to an axis of rotation of the rotor and drive shafts rest in a sealed manner, and a shut-off element displaceable axially with respect to the rotational axis of the rotor within the pump operating chamber, the shut-off element sealing off the pump duct between the inlet and the outlet and comprising opposed sealing faces which rest in a sealed manner against the undulating boundary faces of the pump element and which follow the undulating movement of the boundary faces of the pump element during rotation of the rotor, and a seal which seals off the pump operating media conveying chamber from the housing, and wherein the connecting boundary faces relative to the drive side, are outboard of the seal to maintain safe hygienic conditions in the pump operating media conveying chamber.

2. A pump according to claim 1, wherein the rotor shaft and the drive shaft have a rotary displacement prevention device which penetrate one another at least in part and a radial displacement prevention device which penetrate one another at least in part.

3. A pump according to claim 1, wherein the connecting boundary faces are formed with axial butting structures.

4. A pump according to claim 3, wherein the axial butting structures are constructed with substantially flat face profiles formed at right angles to the rotational axis of the rotor.

5. A pump according to claim 3, wherein the axial butting structures are constructed with surface profiles engaging in one another with positive locking.

6. A pump according to claim 5, wherein the surface profiles are serrated.

7. A pump according to claim 1, wherein the shaft of the rotor and the drive shaft have a radial displacement prevention device which penetrates one another at least in part and prevents relative radial displacement.

8. A pump according to claim 7, wherein the radial displacement-prevention device is formed with retaining studs or springs or pins which extend parallel to the drive shaft and which engage in corresponding recesses or openings.

9. A pump according to claim 1, wherein the shaft of the rotor and the drive shaft have rotary displacement prevention device which penetrates one another at least in part and prevents relative rotary displacement.

10. A pump according to claim 9, wherein the rotary displacement prevention device is formed with retaining studs or springs or pins engaging in recesses or openings.

11. A pump according to claim 9, wherein the rotary displacement prevention device is a bayonet fitting.

12. A pump for fluids or fluid-like media, comprising a housing, an inlet, an outlet, a pump operating media conveying chamber with a pump duct, an intake chamber, a conveying region, an outlet chamber, a rotor which has a rotor shaft, a drive having a drive shaft which is releasably connected to the rotor and having connecting boundary faces attached with a fastening device, the rotor having a pump element with a cylindrical external peripheral face and rotating in the pump duct and with undulating boundary faces extending radially from the rotor shaft, wherein the pump duct is cylindrical at least in the conveying region and is provided at least in the conveying region with a pump duct end face against which the greatest radial points of the pump element relative to an axis of rotation of the rotor and drive shafts rest in a sealed manner, and a shut-off element displaceable axially with respect to the rotational axis of the rotor within the pump operating chamber, the shut-off element sealing off the pump duct between the inlet and the outlet and comprising opposing sealing faces which reset in a sealed manner against the undulating boundary faces of the pump element during rotation of the rotor follow the undulating movement of the boundary faces of the pump element during the rotation of the rotor, and a seal which seals off the pump operating media conveying chamber from the housing, and wherein the fastening device connects the rotor shaft and the drive shaft outside the pump operating media conveying chamber, is resistant to centrifugal force and absorbs at least axial forces and the connecting boundary faces relative to the drive side, are outboard of the seal to maintain safe hygienic conditions in the pump operating media conveying chamber.

13. A pump according to claim 12, wherein the fastening device has clamping and connecting arms which engage over axial butting structures.

14. A pump according to claim 12, including at least two fastening devices, which are connectable to one another.

15. A pump according to claim 12, wherein the at least one fastening device is formed as a clamp.

16. A pump according to claim 12, wherein the at least one fastening device is formed as a bayonet fitting.

17. A pump according to claim 12, wherein the shaft of the rotor and the drive shaft have a radial displacement prevention device which penetrates one another at least in part and prevents relative radial displacement.

18. A pump according to claim 12, wherein the shaft of the rotor and the drive shaft have rotary displacement prevention device which penetrates one another at least in part and prevents relative rotary displacement.

19. A pump according to claim 12, wherein the rotor shaft and the drive shaft have a rotary displacement prevention device which penetrate one another at least in part and a radial displacement prevention device which penetrate one another at least in part.

20. A pump according to claim 12, wherein the at least one fastening device is formed with clamping and connecting arms which have groove-like free spaces for engagement, and axial end engagement structures.

21. A pump according to claim 20, wherein the axial end engagement structures are formed with a rotary displacement prevention device.

22. A pump according to claim 20, wherein the axial end engagement structures are formed with a radial-displacement-prevention device.

23. A pump according to claim 20, wherein the axial end engagement structures are formed with a rotary displacement prevention device and with a radial displacement-prevention device.

24. A pump according to claim 20, wherein the axial end engagement structures are formed with disc-like thickenings which are formed at an end of the rotor shaft and the drive shaft and which each have surface profiles which are arranged around a disc axis and lock in one another in an assembled state.

25. A pump according to claim 24, wherein the surface profiles are serrated.

* * * * *